United States Patent [19]

Ross

[11] Patent Number: 4,700,400
[45] Date of Patent: Oct. 13, 1987

[54] FEATURE EXTRACTION TECHNIQUE FOR USE IN A PATTERN RECOGNITION SYSTEM

[75] Inventor: David J. Ross, Menlo Park, Calif.

[73] Assignee: The Palantir Corporation, Santa Clara, Calif.

[21] Appl. No.: 786,037

[22] Filed: Oct. 10, 1985

[51] Int. Cl.$^4$ ............................................... G06K 9/46
[52] U.S. Cl. ........................................ 382/27; 382/47
[58] Field of Search .................... 382/18, 27, 56, 16, 382/28, 47

[56] References Cited

U.S. PATENT DOCUMENTS 4,259,661  3/1981  Todd ....................................... 382/27
4,542,527  9/1985  Tsunekawa ........................... 382/27

Primary Examiner—Leo H. Boudreau
Attorney, Agent, or Firm—Steven F. Caserza; Walter J. Madden; Alan H. MacPherson

[57] ABSTRACT

A method is provided for forming feature vectors representing the pixels contained in a pattern desired to be recognized, and reference patterns. One part of the feature vector is representative of the pixels contained in the pattern itself, while not requiring a very large feature vector which exactly defines each pixel of the pattern. One embodiment of this invention provides that another part of the feature vector, consisting of one or more bytes of the feature vector, defines the aspect ratio of the pattern. In one embodiment, each byte of the feature vector representing the pixels contained in the character represents the relative ratio of black pixels to total pixels in a specific area of the character; other functions relating input matrix and output feature vector information can be used. In one embodiment of this invention, those areas of the character which are defined by the feature vector together cover the entire character, providing a feature vector describing what might loosely be thought as a "blurred" version of the pattern.

32 Claims, 10 Drawing Figures

```
INPUT ARRAY      INTERMEDIATE ARRAY     OUTPUT ARRAY 1 0 1               2 2                 9 9
   1 1 1               3 3                 8 8
   0 1 0               1 1                 1 7
   0 0 1               0 2
```

FEATURE EXTRACTION TECHNIQUE FOR USE IN A PATTERN RECOGNITION SYSTEM

DESCRIPTION OF THE PRIOR ART

A wide variety of pattern recognition systems are known in the art. Each such system optically receives data depicting a pattern to be recognized, and performs certain tasks on this pattern in order to compare it to known patterns in order to "recognize" the input pattern. A basic flow chart depicting a pattern recognition system is shown in FIG. 1. The input pattern is the pattern which is desired to be recognized. Digitizer 12 converts input pattern 11 to a series of bytes for storage in system memory 13. These bytes are typically binary in nature, reflecting the fact that input pattern 11 is basically a black and white figure. Digitizers are well known in the art and typically are used in such devices as facsimile machines, electronic duplicating machines (as opposed to optical photocopy machines) and optical character recognition systems of the prior art. Memory 13 can comprise any suitable memory device, including random access memories of well-known design. Segmentation 14 serves to divide the image data stored in memory 13 into individual characters. Such segmentation is known in the prior art, and is described, for example, in *Digital Picture Processing*, Second Edition, Volume 2, Azriel Rosenfeld and Avinash C. Kak, Academic Press, 1982, specifically, Chapter 10 entitled "Segmentation".

Feature extraction means 15 serves to transform each piece of data (i.e., each character) received from segmentation 14 in order to transform that data into a standard predefined form for use by identification means 16, which in turn identifies each character as one of a known set of characters. Output means 17 serves to provide data output (typically ASCII, or the like) to external circuitry (now shown), as desired.

Identification means 16 can be any one of a number of prior art identification means typically used in pattern recognition systems, including, more specifically, optical character recognition systems. One such identification means suitable for use in accordance with the teachings of this invention is described in U.S. Pat. No. 4,259,661, issued Mar. 31, 1981 to Todd, entitled "Apparatus and Method for Recognizing a Pattern". Identification means 16 is also described in *Syntatic Pattern Recognition and Applications*, K. S. Fu, Prentice Hall, Inc., 1982, specifically, Section 1.6, and Appendices A and B.

Inasmuch as this invention pertains to a method for use as feature extraction means 15 for use in an optical character recognition system, this patent application, including the description of prior art herein, will focus on feature extraction means 15, although it is to be understood that the teachings of this invention are equally applicable for use in pattern recognition systems for recognizing patterns other than characters, or indeed even to systems used to recognize any information capable of being represented mathematically.

Prior art feature extraction techniques generally fall into two categories, namely, "matrix overlay", and "feature analysis". In matrix overlay, an input character to be recognized is physically compared with a plurality of known patterns which are stored in memory. Essentially, both the input data and the stored, known characters, containing a plurality of pixels (picture elements) are each stored as a feature vector comprising a bit for each pixel (both white and black) of the character. This results in a very large number feature vectors being stored if the test pattern is to be compared with a large number of reference patterns. Matrix overlay type of feature extraction generally employs a figure of merit which is a number derived by a best-match procedure of the individual pixels in which the individual pixels of the input character and the individual pixels of a known character are combined in an Exclusive OR logical operation. The resulting figure of merit of this Exclusive OR operation is a number depicting the number of pixels which do not match in the two patterns. This information is provided to identification means 16, which selects as the recognized character, that character having the lowest number of mismatched pixels.

The matrix overlay method of feature extraction is useful for matching input characters with a very limited number of fonts or reference characters. This is one reason that special "OCR" character fonts have been developed which, although very well suited for use with matrix overlay feature extraction techniques, are not particularly legible by humans. Matrix overlay feature extraction techniques are relatively insensitive to "speckle" noise (i.e., a dirty page), and are relatively insensitive to unintended breaks within characters. However, matrix overlay is highly sensitive to changes in shape, i.e., changes in fonts, type size, the use of italics, underlines, bold print, and similar common occurrences. Therefore, matrix overlay feature extraction techniques are not really suitable for widespread use in systems which must recognize characters having a large number of fonts, type sizes, and the like, without requiring an enormous investment in hardware and computational abilities.

Another prior art technique used for feature extraction is so-called "feature analysis". Feature analysis is a feature extraction technique which looks at each character to be recognized and determines whether such characters contain any one or more of a plurality of specific features. Such specific features often used in feature analysis feature extraction techniques include the location of strokes in certain positions, location of edges of the character, location of areas which are completely bounded by the edge of a character (such as the upward pointed promontory at the top of a capital letter "A", rightward pointing "bays", such as the opening in the letter "C", and the like. Such feature analysis techniques are described, for example, in *Computer Analysis and Perception*, Volume I, "Visual Signals", Ching Y. Suen, Renato De Mori, CRC Press, Inc., 1982, particularly, Chapter 3. There are a great number of feature analysis techniques depending upon, in part, the particular features that a given person believes are important in recognizing characters. The data output from a feature analysis feature extraction technique is a mathematical feature vector defining the existence of, the quantity of, or the strength of, specific features in an unknown character to be recognized. This feature vector is then used by the identification means to compare with stored feature vectors of known characters, with the unknown character being identified as that known character having a feature vector most similar to the feature vector of the unknown character. In some feature analysis techniques, certain features are more heavily weighted than others during the comparison of the unknown character feature vector and the known character feature vectors. In general, the feature analysis technique, regardless of which features are being located and used, are very sensitive to undesired breaks in characters and to speckle noise. On the other hand, feature analysis feature extraction techniques generally provide less sensitivity to changes in shapes, and thus changes of font and type size, than does matrix overlay feature extraction techniques.

In addition, there has been used in the prior art a technique which combines some of the characteristics of the matrix overlay and the feature analysis feature extraction techniques. The so-called "template matching" techniques use known masks to view regions within the unknown character in order to locate certain features. Thus, a certain mask might be used to view the left edge of the character to determine if there is a vertical line on the left edge of the character, as in the letter "K". while this technique overcomes some of the disadvantages of the matrix overlay and feature analysis feature extraction techniques, template matching feature extraction techniques tend to share many of the same drawbacks. For example, template matching, like feature analysis, requires a great deal of computational ability.

Another prior art feature extraction technique is described in "Chinese Character Recognition by Hierarchical Pattern Matching", S. Yamamoto, A. Nakajima, K. Nakata, *Proceedings of the First International Joint Conference on Pattern Recognition,* Oct. 30 through Nov. 1, 1973, Washington, D.C., The Institute of Electrical and Electronics Engineers, Inc., pages 187-196. Yamamoto et al. describe a matrix overlay feature extraction technique. However, in each step of this feature extraction technique, the pixels forming the character to be recognized are used to form a series of "compressed images", each of such compressed images being compared with known characters whose images have been similarly compressed. During each step, less "compression" is used, and a number of known characters which are determined not to be the unknown character, are eliminated from subsequent comparisons, thereby speeding the comparison process. This type of matrix overlay technique provides certain advantages as compared with the matrix overlay techniques described above, however, since it remains a matrix overlay technique, it is difficult to use this technique to recognize characters from a large number of fonts, without requiring an undue amount of hardware and computational ability.

SUMMARY

A unique method is provided for forming feature vectors representing the pixels contained in a pattern desired to be recognized, and reference patterns. One part of the feature vector developed in accordance with the teachings of this invention is representative of the pixels contained in the pattern itself, while not requiring a very large feature vector which exactly defines each pixel of the pattern. One embodiment of this invention provides that another part of the feature vector, consisting of one or more bytes of the feature vector, defines the aspect ratio of the pattern. In one embodiment, each byte of the feature vector representing the pixels contained in the character reresents the relative ratio of black pixels to total pixels in a specific area of the character; other functions relating input matrix and output feature vector information can be used, including weighted summation of the pixels of the input matrix. In one embodiment of this invention, these areas of the character which are defined by the feature vector together cover the entire character, providing a feature vector describing what might loosely be thought of as a "blurred" version of the pattern.

BRIEF DESCRIPTION OF THE DRAWINGS

FIGS. 2a through 2c depict the technique used in accordance with the teachings of this invention to transform a matrix of a first size containing bits representing pixels in an image into a matrix of a second size containing bytes representing a "blurred" version of that image;

FIGS. 3a through 3c also illustrate the technique used in accordance with the teachings of this invention to transform a matrix of a first size containing bits representing pixels in an image into a matrix of a second size containing bytes representing a blurred version of that image;

DETAILED DESCRIPTION

Figure 1:
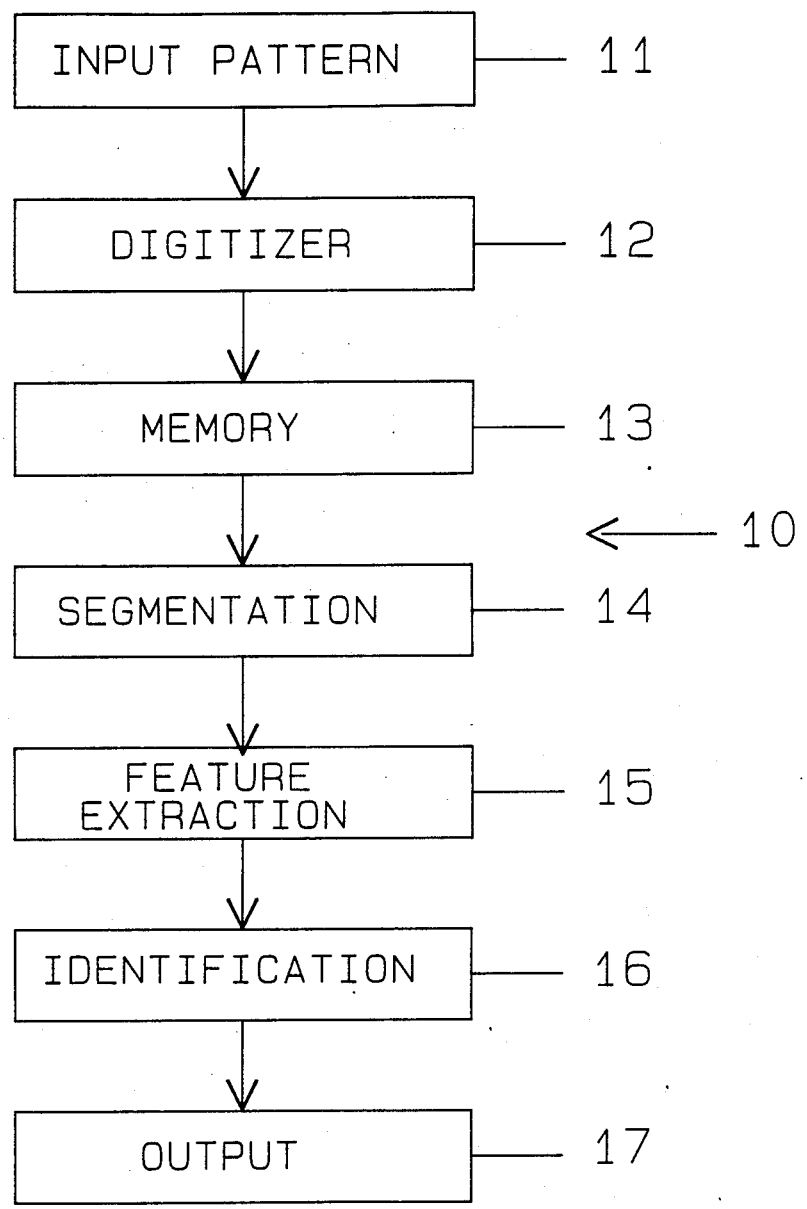
FIG. 1 is a block diagram depicting both the physical organization and process flow of a typical prior art pattern or character recognition system.

In accordance with the teachings of this invention, a unique method is provided for forming feature vectors defining the pixels contained in a pattern or character desired to be recognized. The feature vector developed in accordance with the teachings of this invention is, unlike that of the prior art, representative of the pixels contained in the character itself while, unlike matrix overlay techniques, not forming a very large feature vector which exactly defines each pixel of the image. In one embodiment of this invention, the feature vector contains 40 bytes, plus 16 bytes defining the aspect ratio (the square root of the ratio of the character's width to the character's height). In this embodiment, each of the 40 bytes of the feature vector define the relative number of black pixels to total pixels in each of 40 different areas of the character. In one embodiment it is not desirable to simply divide the character into 40 pieces since, in general, the number of pixels in the character is not evenly dividable by 40. The technique employed in this embodiment effectively divides the character into 40 equal regions by allowing portions of one pixel to be apportioned among several (in one embodiment up to four) regions.

This unique technique allows an optical character recognition system using this technique to compare an unknown character with a plurality of known characters (represented by their own unique feature vectors) in a manner thought to be similar to the way comparisons are made by humans. This ability is not merely of academic interest; it has been determined that this technique allows the recognition of characters, and avoids the misrecognition of characters, to a much more reliable extent than known in the prior art for characters in many different type fonts.

It has been empirically determined, by performing optical character recognition on a rather large amount of input data, that a feature vector representing a 5×8 matrix (width equal to 5, height equal to 8) representing a character, provides the greatest accuracy in recognition of Roman print. For scripts other than Roman, the same exercise can be performed to determine if different aspect ratios would be better suited for recognizing such other character sets.

Since, in general, the digitization of text being read results in a character represented by a number of pixels larger than a 5×8 matrix, it is necessary to have a technique for transforming, for example, a 20-pixel-wide by 30-pixel-high image into a 5×8 byte feature vector matrix. In prior art techniques for reducing a large matrix to a smaller matrix for easier manipulation using feature analysis or matrix overlay feature analysis techniques, only selected pixels would be included in the transformed array. The selected pixels would, hopefully, be selected to be key pixels which enhance the ability to distinguish between two similar characters such as a "c" and an "e". While these techniques did allow the transformation of data into a more manageable size, they still had the attendant disadvantages described above with regard to feature analysis or matrix overlay feature analysis techniques. Conversely, small characters, such as the "period", must be expanded to fill a 5×8 feature vector matrix.

Figures 2A, 2B, 3A, 3B, 3C:
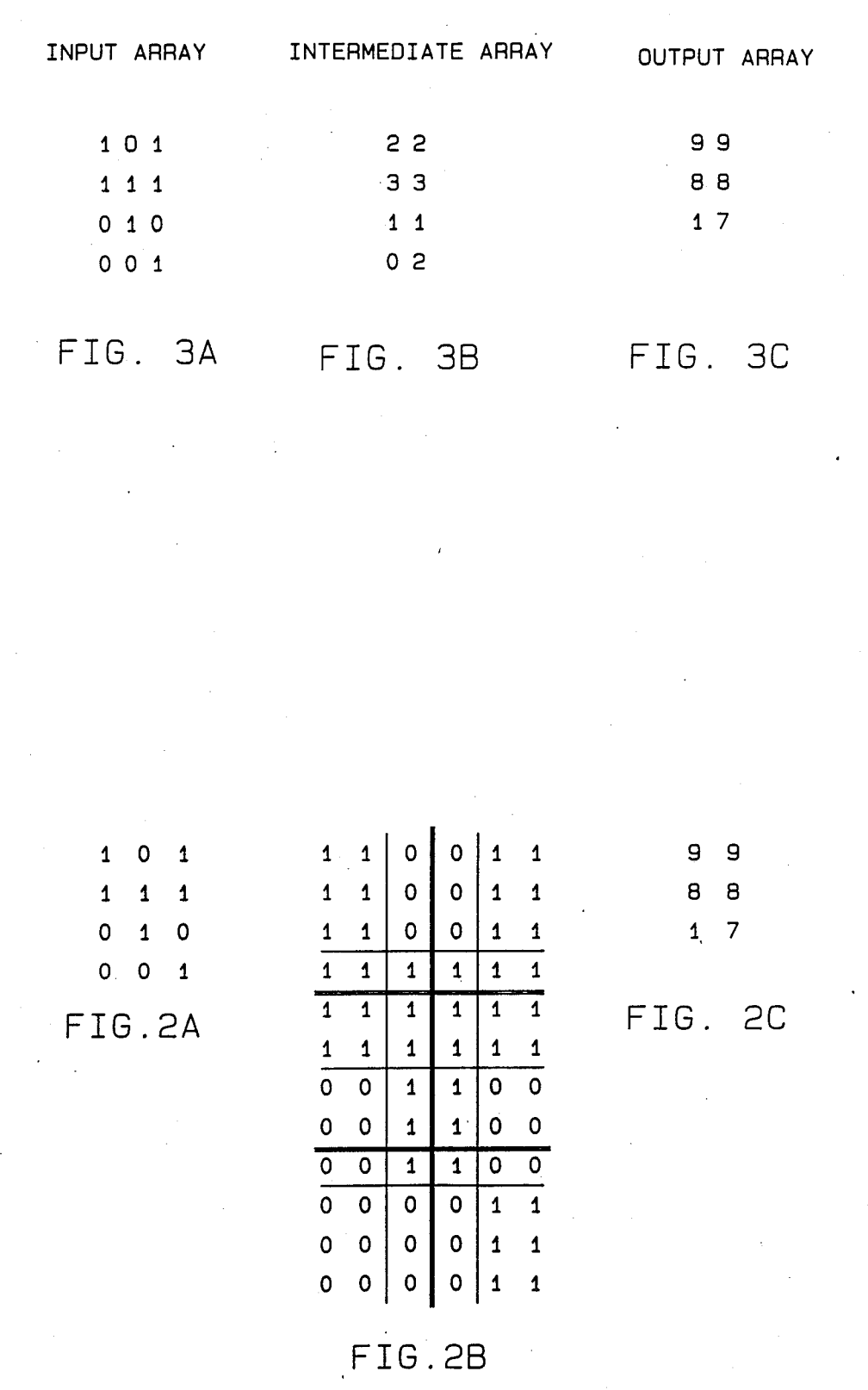

In accordance with the teachings of this invention, a unique technique is used to transform a matrix of a first size defining a character into a matrix of a second size which defines the same character in a manner thought to be similar to the way that humans view the character, albeit a "blurred" version of the character. This technique can be described with reference to FIGS. 2a through 2c. FIG. 2a represents an N×M matrix, for example, as received from segmentation means 14 (FIG. 1). While FIG. 2a shows a 4×3 matrix, this is to be understood to be exemplary only, and in reality a typical input matrix might be 20 pixels wide by 30 pixels high or more. Further, for sake of example, assume it is desired to transform the 4×3 matrix of FIG. 2a into a 3×2 matrix, as shown in FIG. 2c. FIG. 2b depicts an intermediate matrix of size NP×MQ bits (although it is to be understood that other sized intermediate matrices could be used), where N is the height of the input matrix, M is the width of the input matrix, P is the height of the output matrix, and Q is the width of the output matrix. In order to fill the matrix of FIG. 2b, the value of each bit of FIG. 2a is entered into FIG. 2b Q times in the horizontal direction and P times in the vertical direction, as shown (dashed rectangles). In order to complete the transformation, the data from the intermediate matrix of FIG. 2b is entered into the P×Q matrix of FIG. 2c by summing the value of each of the P×Q regions of FIG. 2b (solid rectangles), each having size N×M, as shown. Of course, this step of summing can be a weighted summation if desired. This results in a transformation of the N×M (4×3) input matrix of FIG. 2a to the P×Q (3×2) output matrix of FIG. 2c. Of importance, the output matrix of FIG. 2c represents the character previously represented by input matrix 2a in a "blurred" manner. In other words, the data in FIG. 2c is "blurred" from the data of FIG. 2a in such a manner that each byte of the matrix of FIG. 2c represents a region of the original character represented in FIG. 2a.

Figure 4:
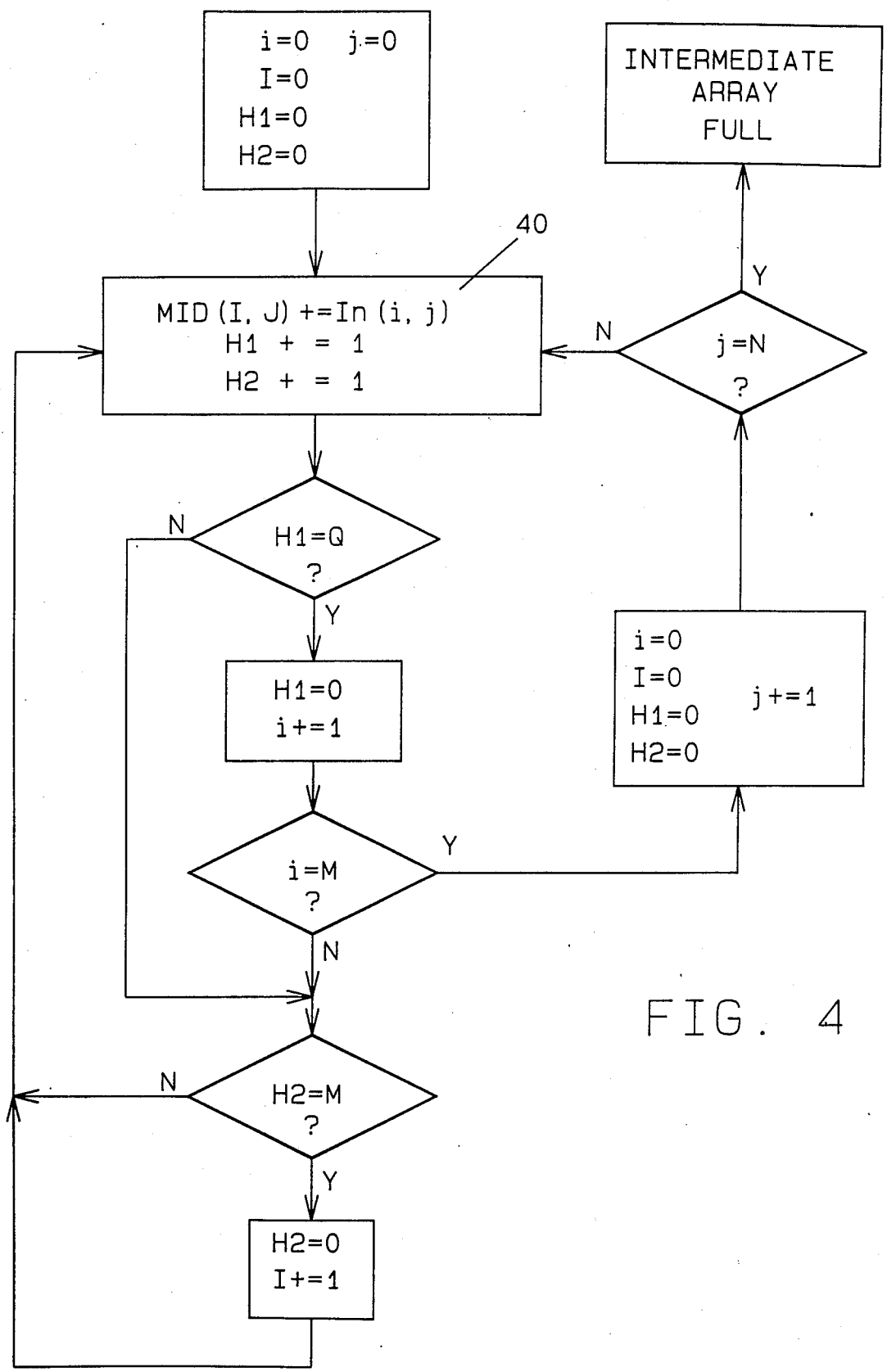
FIG. 4 is a flow chart depicting the method of FIGS. 3a and 3b.
Figure 5:
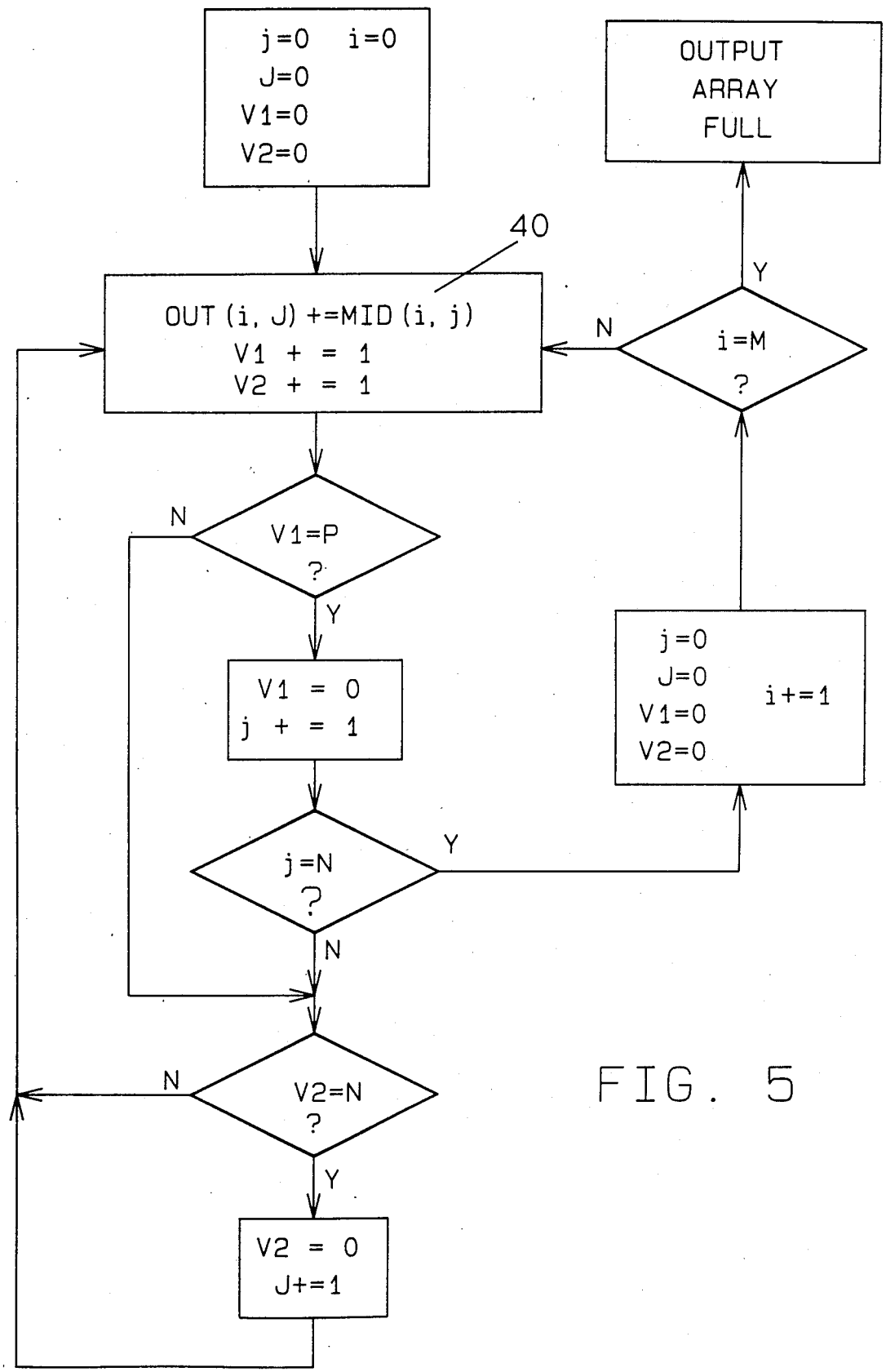
FIG. 5 is a flow chart depicting the method of FIGS. 3b and 3c.

If the input array is fairly large, this embodiment results in a very large intermediate array (FIG. 2b). In another embodiment of this invention, the same output array (FIG. 3c) is created with the use of a series of counters that coordinates when elements of the input array (FIG. 3a) are to be added to the elements of the output array. In the second embodiment, an intermediate array is created having the width of the output array and the height of the input array. The intermediate array (FIG. 3b) so created is incremented first, using the elements of the input array. When the intermediate array is full, the elements of the intermediate array are used to fill the output array. FIG. 4 is a flowchart depicting the process of filling the intermediate array, and Table 1 depicts the values of the various counters and indices used in the flowchart of FIG. 4 in order to fill the intermediate array. Similarly, FIG. 5 is a flowchart depicting the process for filling the output array, once the intermediate array has been filled, and Table 2 shows the values of the counters indices used in the filling of the output array. The steps in the Tables of this specification are numbered just prior to execution of the step marked with the numeral "40" in their associated flowchart.

For the purpose of this specification, the following variables are used in conjunction with flowcharts and the tables in order to describe the operation of the counters.

M = width of Input Array (bit map)
Q = width of Output Array
N = height of Input Array
P = height of Output Array
i = Input Array horizontal index. Increments from 0 to M−1.
I = Output Array horizontal index. Increments from 0 to Q−1.
j = Input Array vertical index. Increments from 0 to N−1.
J = Output Array vertical index. Increments from 0 to P−1.
H1 = Horizontal counter to determine i incrementation. Increments from 0 to Q.
H2 = Horizontal counter to determine I incrementation. Increments from 0 to M.
V1 = Vertical counter to determine j incrementation. Increments from 0 to P.
V2 = Vertical counter to determine J incrementation. Increments from 0 to N.

TABLE 1

| | (FIG. 4) | | | | | | |
|---|---|---|---|---|---|---|---|
| | i | I | H1 | H2 | j | V1 | V2 | J |
| Start | 0 | 0 | 0 | 0 | 0 | 0 | 0 | 0 |
| Step1 | 0 | 0 | 1 | 1 | 0 | 0 | 0 | 0 |
| Step2 | 1 | 0 | 0 | 2 | 0 | 0 | 0 | 0 |
| Step3 | 1 | 1 | 1 | 0 | 0 | 0 | 0 | 0 |
| Step4 | 2 | 1 | 0 | 1 | 0 | 0 | 0 | 0 |
| Step5 | 2 | 1 | 1 | 2 | 0 | 0 | 0 | 0 |
| Step6 | 0 | 0 | 0 | 0 | 1 | 0 | 0 | 0 |
| | | | | etc. | | | | |

TABLE 2

| | (FIG. 5) | | | | | | |
|---|---|---|---|---|---|---|---|
| | i | I | H1 | H2 | J | V1 | V2 | J |
| Start | 0 | 0 | 0 | 0 | 0 | 0 | 0 | 0 |
| Step1 | 0 | 0 | 0 | 0 | 0 | 1 | 1 | 0 |
| Step2 | 0 | 0 | 0 | 0 | 0 | 2 | 2 | 0 |
| Step3 | 0 | 0 | 0 | 0 | 1 | 0 | 3 | 0 |
| Step4 | 0 | 0 | 0 | 0 | 1 | 1 | 0 | 1 |
| Step5 | 0 | 0 | 0 | 0 | 1 | 2 | 1 | 1 |
| Step6 | 0 | 0 | 0 | 0 | 2 | 0 | 2 | 1 |
| Step7 | 0 | 0 | 0 | 0 | 2 | 1 | 3 | 1 |
| Step8 | 0 | 0 | 0 | 0 | 2 | 2 | 0 | 2 |
| Step9 | 0 | 0 | 0 | 0 | 3 | 0 | 1 | 2 |
| Step10 | 0 | 0 | 0 | 0 | 3 | 1 | 2 | 2 |
| Step11 | 0 | 0 | 0 | 0 | 3 | 2 | 3 | 2 |

TABLE 2-continued

| | | (FIG. 5) | | | | | |
|---|---|---|---|---|---|---|---|
| | i | I | H1 | H2 | j | V1 | V2 | J |
| Step12 | 1 | 0 | 0 | 0 | 0 | 0 | 0 | 0 | etc.

TABLE 3

| | | (FIG. 6) | | | | | |
|---|---|---|---|---|---|---|---|
| | i | I | H1 | H2 | j | V1 | V2 | J |
| Start | 0 | 0 | 0 | 0 | 0 | 0 | 0 | 0 |
| Step1 | 0 | 0 | 1 | 1 | 0 | 0 | 0 | 0 |
| Step2 | 1 | 0 | 0 | 2 | 0 | 0 | 0 | 0 |
| Step3 | 1 | 1 | 1 | 0 | 0 | 0 | 0 | 0 |
| Step4 | 2 | 1 | 0 | 1 | 0 | 0 | 0 | 0 |
| Step5 | 2 | 1 | 1 | 2 | 0 | 0 | 0 | 0 |
| Step6 | 0 | 0 | 0 | 0 | 0 | 1 | 1 | 0 |
| Step7 | 0 | 0 | 1 | 1 | 0 | 1 | 1 | 0 |
| Step8 | 1 | 0 | 0 | 2 | 0 | 1 | 1 | 0 |
| Step9 | 1 | 1 | 1 | 0 | 0 | 1 | 1 | 0 |
| Step10 | 2 | 1 | 0 | 1 | 0 | 1 | 1 | 0 |
| Step11 | 2 | 1 | 1 | 2 | 0 | 1 | 1 | 0 |
| Step12 | 0 | 0 | 0 | 0 | 0 | 2 | 2 | 0 |
| Step13 | 0 | 0 | 1 | 1 | 0 | 2 | 2 | 0 |
| Step14 | 1 | 0 | 0 | 2 | 0 | 2 | 2 | 0 |
| Step15 | 1 | 1 | 1 | 0 | 0 | 2 | 2 | 0 |
| Step16 | 2 | 1 | 0 | 1 | 0 | 2 | 2 | 0 |
| Step17 | 2 | 1 | 1 | 2 | 0 | 2 | 2 | 0 |
| Step18 | 0 | 0 | 0 | 0 | 1 | 0 | 3 | 0 |
| Step19 | 0 | 0 | 1 | 1 | 1 | 0 | 3 | 0 |
| Step20 | 1 | 0 | 0 | 2 | 1 | 0 | 3 | 0 |
| Step21 | 1 | 1 | 1 | 0 | 1 | 0 | 3 | 0 |
| Step22 | 2 | 1 | 0 | 1 | 1 | 0 | 3 | 0 |
| Step23 | 2 | 1 | 1 | 2 | 1 | 0 | 3 | 0 |
| Step24 | 0 | 0 | 0 | 0 | 1 | 1 | 0 | 1 | etc.

Figure 6:
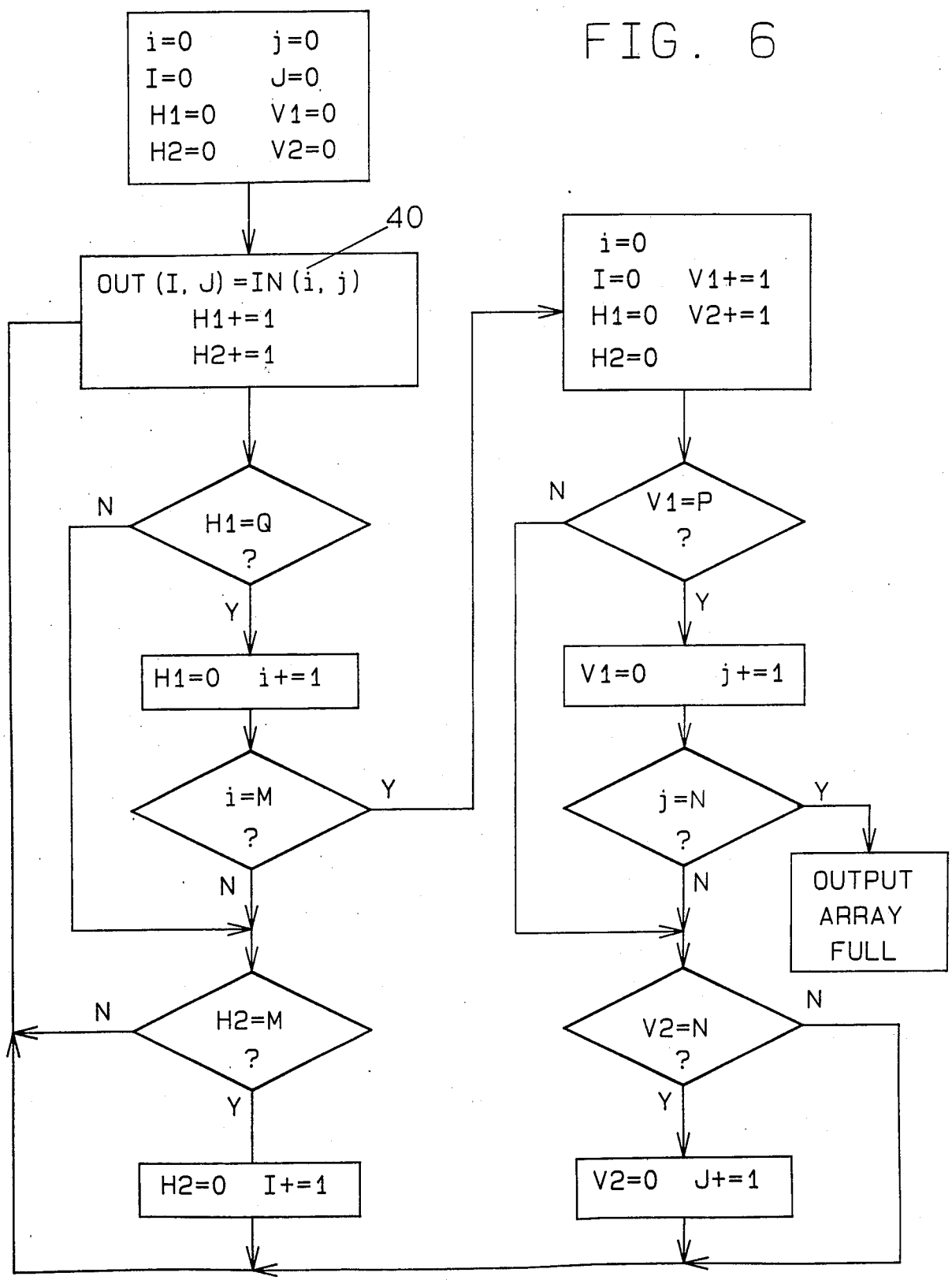
FIG. 6 is a flow chart depicting a similar method of this invention in which the intermediate array is not used.

In another embodiment of this invention, the use of the intermediate array is replaced by utilizing additional counters. FIG. 6 is a flowchart depicting the operation of this third embodiment of my invention. Table 3 traces the steps in this algorithm for the transformation of the input array of FIG. 3a into the output array of FIG. 3c.

As previously described, a typical input matrix defining a character might be 20 pixels wide by 30 pixels high, and the blurred output matrix might be 5 bytes wide by 8 bytes high, thus incidentally greatly reducing the number of bytes required to be manipulated in order to further process this date. As will be readily understood by those of ordinary skill in the art in light of the teachings of this invention, a 20 wide by 30 high input matrix containing single bit binary numbers representing white and black pixels, when confounded to a matrix of any size, can provide an output byte having a maximum value of 600 (N times M) corresponding to a region which is all black (all input pixels in that region=1).

In one embodiment of this invention, the feature vector (except for those bytes of the feature vector representing the aspect ratio or other additional features) is normalized such that the norm is equal to 256 in accordance with the following equation:

$$\sum_{i=1}^{N} (x^2_i) = 256^2; \text{ where}$$

$x_i$ = the ith byte of the feature vector; and N = the number of bytes in the blurred pixel part of feature vector.

The number 256 has been empirically determined to produce output vectors with the smallest number of bits per element that still gives results from identification means approximately as accurate as those from feature vectors with arbitrary large numbers of bits per element.

Normalization provides several advantages. Normalization reduces the value of any given byte, thereby minimizing the number of bits required to represent that byte.

More importantly, this normalization is performed in order to eliminate the effects of variations in character size, thus requiring only a single set of reference vectors per font over a wide range of type size. This is in stark contrast to prior art techniques in which, say, a set of reference characters feature vectors would be required for Courier 10 point, a separate set of reference character feature vectors required for Courier 12 point, a separate set for Courier 14 point, and so on. In other words, in accordance with the teachings of this invention, the feature vector, for example, for a 12-point Courier "e" is exactly the same as the feature vector for a 14-point Courier "e", while in OCR systems using matrix overlay feature extraction techniques, these would have two separate feature vectors. This allows a dramatic reduction in the number of stored reference character feature vectors, with an attendant decrease in cost and greatly-enhanced speed of operation.

In relatively few cases (empirically determined to be less than approximately 1/10 of 1%), this normalization technique results in one or more bytes of the normalized vector having a value of greater than 127. In this event, these values are set equal to 127, thereby maintaining each byte of the feature vector as a value which can be represented in 7 bits.

As an additional feature of this invention, one or more additional bytes, representing additional features for the input pattern, are used to form the feature vector. In one embodiment, 16 such bytes are used to each represent the following value:

$$K \sqrt{W/H} \text{ ; where}$$

W = the width of the input character.
H = the height of the input character.
K is a constant which has been empirically determined to be equal to approximately $$\left[ \frac{3(KKHEIGHT)}{16} (2)^{13.5} \right]^{\frac{1}{2}}$$

where KKHEIGHT = the number of vertical elements in the feature vector.

In this manner, the bytes representing the aspect ratio actually represent a weighted aspect ratio which has been determined to be the relative importance of the aspect ratio in comparing unknown characters to known characters, relative to the remaining bytes defining the feature vector. In this embodiment, a plurality of such weighted aspect ratio representations are used in order to keep their values such that they can each be represented in 7 bits or truncated to 7 bits without great loss of accuracy. If this is not necessary, a single aspect ratio byte could be used. In this embodiment of this invention, the value K is actually ¼ of the weighting factor determined to be most effective for accurately recognizing characters and hence there are 16 aspect fields in the feature vector. In this manner, when comparing a feature vector representing a character to be recognized with a known reference character feature vector, each aspect ratio byte is dealt with in a manner which is identical to how each of the initial 40 bytes are dealt with. In other words, when comparing two feature vectors, the following equation is performed:

$$D(X, Y) = \sum_{i=1}^{N} (X_i - Y_i)^2$$

X = feature vector X;
Y = feature vector Y;
D(X,Y) = the distance between feature vector X and feature vector Y;
$X_i$ = the ith element of feature vector X;
$Y_i$ = the ith element of feature vector Y; and
N = the number of elements in each feature vector (N = 56 in the feature vector described above having 40 blurred pixel bytes and 16 bytes representing the aspect ratio).

While this specification illustrates specific embodiments of this invention, it is not to be interpreted as limiting the scope of the invention. Many embodiments of this invention will become evident to those of ordinary skill in the art in light of the teachings of this specification.

I claim:

1. The method of creating an output feature vector array of height P and width Q representing an input pattern, comprising the steps of:
    obtaining said input pattern in the form of an input array of height N and width M;
    forming an intermediate array having a height NP and width MQ;
    using the information contained in said input array to provide data for said intermediate array; and
    using the information contained in said intermediate array to provide data for said output feature vector array.

2. The method of claim 1 wherein said step of using the information contained in said input array to provide data for said intermediate array comprises the step of entering each element in said input array into said intermediate array Q times in the horizontal direction and P times in the vertical direction.

3. A method for extracting features of a pattern consisting of pixel data comprising the steps of:
    fetching a pattern image containing a plurality of elements;
    creating a blurred pattern image by applying a transformation to said pattern image comprising the steps of:
        creating an intermediate array consisting of said elements of said pattern image each written P times vertically and Q times horizontally; and
        creating an output array containing one or more elements of a feature vector, said output array having horizontal dimension Q and vertical dimension P, said output array consisting of the elements of said intermediate array summed in groups of N vertical elements and M horizontal elements, where N is the height of said pattern image in pixels and M is the width of the pattern image in pixels.

4. A method for extracting features of a pattern consisting of pixel data comprising the steps of:
    fetching a pattern image containing a plurality of elements;
    creating a blurred pattern image by applying a transformation to said pattern image, comprising the steps of:
        creating an intermediate array having a first dimension equal to the number of regions into which said pattern image is desired to be divided in said first dimension and having a second dimension equal to the number of pixels of said pattern image in said second dimension;
        using counters to determine which pixel in said pattern image is to have its value added to which element of said intermediate array; and
        using counters to determine which element in said intermediate array is to have its value added to which element of an output array containing a feature vector or part of a feature vector.

5. A method for extracting features of a pattern consisting of pixel data comprising the steps of:
    fetching a pattern image including a plurality of elements arranged in a plurality of rows of pixels;
    applying a transformation to said pixels to create a transformed input pattern; and
    using said transformed input pattern to produce in an output array a feature vector, or part of a feature vector, for pattern recognition;
    said transformation comprising the steps of:
        generating first multiples of said pixels in a first expansion of said pattern image; and
        generating second multiples of said pixels in a second expansion of said pattern; and
        whereby said step of using said transformed input pattern comprises the steps of summing said first and second multiple pixels in equally sized groups, each of said sums of said first and second multiples of said pixels being a member of said feature vector.

6. A method as in claim 5 wherein the width and height of each of said groups is proportional to the width and height of said pattern image.

7. A method as in claim 6 wherein the number of pixels across the width of said pattern image divided by the number of pixels across the width of each said group is equal to the number of said groups across the width of said pattern image.

8. A method for extracting features of a pattern consisting of pixel data comprising the steps of:
    fetching a pattern image including a plurality of elements arranged in a plurality of rows of pixels;
    applying a transformation to said pixels to produce in an output array a feature vector, or part of a feature vector, for pattern recognition, said output array including a plurality of groups of elements representing corresponding rows of said output array, said transformation comprising the steps of:
        summing the value of each pixel in a row of said pixels of said pattern image for a first predetermined number of times (Q) into an intermediate accumulator and advancing to the next one of said pixels in said row;
        transferring the contents of said intermediate accumulator to an element of said output array and restoring said intermediate accumulator with the value of the next element of said output array after each of a second predetermined number of accumulating steps (M);

repeating said step of summing and said step of transferring for a third predetermined number of times (N) before advancing to the next group of elements of said output array; and repeating said step of summing and said step of transferring for a fourth predetermined number of times (P) before advancing to the first element of the next row of said pixels, wherein said first predetermined number is equal to the number of elements in a row of said output array;

wherein said second predetermined number if equal to the number of pixels in a row of said image pattern;

wherein said third predetermined number is equal to the number of rows in said output array; and wherein said fourth predetermined number is equal to the number of rows of said image pattern.

9. A method for extracting features of a pattern consisting of pixel data comprising the steps of:

fetching a pattern image including a plurality of elements arranged in a plurality of rows of pixels;

applying a transformation to said pixels to produce in an output array a feature vector, or part of a feature vector, for pattern recognition, said transformation comprising the steps of:

summing the value of each pixel in a row of said pixels of said pattern image for a first predetermined number of time (Q) into an intermediate accumulator and advancing to the next one of said pixels;

transferring the contents of said intermediate accumulator to an element of said intermediate array after each of a second predetermined number of summing steps (M);

advancing to the next row of said pixels and the next element of said output array when all pixels of a row of pixels is processed;

summing the value of each element in a column of said intermediate array for a third predetermined number of times (N) into an output accumulator and advancing to the next element of said intermediate array;

transferring the contents of said output accumulator to an element of said output array after each of a fourth predetermined number of summing steps (P); and advancing to the next column of elements of said intermediate array and said elements of said output array when all elements of a column of said intermediate array are processed, wherein said first predetermined number is equal to the number of elements in a row of said output array;

wherein said second predetermined number if equal to the number of pixels in a row of said image pattern;

wherein said third predetermined number is equal to the number of rows in said output array; and wherein said fourth predetermined number is equal to the number of rows of said image pattern.

10. The method as in claims 3, 4, 5, 8 or 9 wherein elements of said output array represent portions of said pattern image which are equally spaced across the width of said pattern image.

11. The method as in claims 3, 4, 5, 8 or 9 wherein elements of said output array represent portions of said pattern image which are evenly spaced along the height of said pattern image.

12. The method as in claim 10 wherein said equal spacing across the width of said pattern image divides said pattern image horizontally into five equal parts.

13. The method as in claim 11 wherein said equal spacing along the height of said pattern image divides said pattern image vertically into eight equal parts.

14. The method of claims 3, 4, 5, 8 or 9 wherein said pattern image consists of binary data.

15. The method of claims 3, 4, 5, 8 or 9 wherein said pattern image represents a character.

16. The method as in claims 3, 4, 5, 8 or 9 wherein said elements of said pattern image represent grey level of pixels.

17. The method of claims 3, 4, 5, 8 or 9 wherein additional features, not related to said transformation are used as additional elements of said feature vector.

18. The method of claim 17 wherein said additional features relate to the aspect ratio of said pattern image.

19. The method of claim 18 wherein said features which relate to the said aspect ratio of said pattern image are proportional to square-root (M/N), where M is the width in pixels of said original pattern image and N is the height in pixels of said pattern image.

20. The method of claim 19 wherein said proportion is $$\left[ \frac{3(KKHEIGHT)}{10} (2)^{13.5} \right]^{\frac{1}{2}}$$

where KKHEIGHT is the number of vertical elements in said feature vector.

21. The method of claims 3, 4, 5, 8 or 9 wherein selected elements of said feature vector are normalized.

22. The method of claim 21 wherein said selected elements are said elements from said transformation.

23. The method of claim 22 wherein said normalization causes said selected elements of said feature vector to be insensitive to the height or width of said pattern image.

24. The method of claim 21 wherein the norm of said selected elements of said feature vector is 256.

25. The method as in claims 5 or 8 wherein said step of summing is a weighted summation.

26. The method as claimed in claims 8 or 9 wherein said first predetermined number is 5; and wherein said third predetermined number is eight.

27. The method as in claims 3 or 4 wherein elements of said intermediate array represent said regions of said pattern image which are evenly spaced across the width of said pattern image.

28. The method as in claims 3 or 4 wherein said elements of said intermediate array represent regions of said pattern image which are evenly spaced along the height of said pattern image.

29. The method as in claim 10 wherein said even spacing across the width of said pattern image divides said pattern image horizontally into five equal parts.

30. The method as in claim 12 wherein said even spacing along the height of said pattern image divides said pattern image vertically into eight equal parts.

31. The method of claim 3, 4, or 9 wherein a weighted summation of said elements of said intermediate array is used to create said output array.

32. A method as in claim 6 wherein the number of pixels across the height of said pattern image divided by the number of pixels across the height of each said group is equal to the number of said groups across the height of said pattern image.

33. The method of claims 3, 4, or 9 wherein weighted summation of said elements of said pattern image is used to create said intermediate array.

* * * * *